United States Patent
Coulson

(10) Patent No.: US 12,448,922 B2
(45) Date of Patent: Oct. 21, 2025

(54) GAS TURBINE ENGINE FUEL SYSTEM

(71) Applicant: ROLLS-ROYCE plc, London (GB)

(72) Inventor: James Coulson, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/807,195

(22) Filed: Aug. 16, 2024

(65) Prior Publication Data

US 2025/0067218 A1 Feb. 27, 2025

(30) Foreign Application Priority Data

Aug. 22, 2023 (GB) ..................................... 2312815

(51) Int. Cl.
| | | |
|---|---|---|
| F02C 7/224 | (2006.01) | |
| B64D 37/30 | (2006.01) | |
| B64D 37/34 | (2006.01) | |
| F02C 3/22 | (2006.01) | |
| F02C 9/40 | (2006.01) | |

(52) U.S. Cl.
CPC ............... *F02C 7/224* (2013.01); *B64D 37/30* (2013.01); *B64D 37/34* (2013.01); *F02C 3/22* (2013.01); *F02C 9/40* (2013.01)

(58) Field of Classification Search
CPC ............. F02C 7/224; F02C 3/22; B64D 37/34
See application file for complete search history.

(56) References Cited

U.S. PATENT DOCUMENTS

| | | | |
|---|---|---|---|
| 2022/0381185 A1 | 12/2022 | Muldoon et al. | |
| 2023/0092811 A1 | 3/2023 | Palmer | |
| 2023/0122350 A1* | 4/2023 | Minas | F02C 7/224 |
| | | | 60/39.281 |
| 2023/0243300 A1* | 8/2023 | Lambert | F02C 3/22 |
| | | | 60/39.461 |

FOREIGN PATENT DOCUMENTS

| | | |
|---|---|---|
| EP | 4095368 A1 | 11/2022 |
| EP | 4163481 A1 | 4/2023 |
| WO | 2022023648 A1 | 2/2022 |

OTHER PUBLICATIONS

Great Britain search report dated Dec. 20, 2023, issued in GB Patent Application No. 2312815.0.
European search report dated Dec. 9, 2024, issued in EP Patent Application No. 24190545.4.

* cited by examiner

*Primary Examiner* — Katheryn A Malatek

(57) ABSTRACT

A fuel system for a hydrogen fueled gas turbine engine comprises a main hydrogen fuel storage unit configured to store liquid hydrogen. The main fuel storage unit comprises an ullage space configured to store ullage fluid comprising gaseous or supercritical hydrogen. The system further comprises a liquid hydrogen drain line configured to provide liquid hydrogen from the main hydrogen fuel storage unit to a fuel conduit, the fuel conduit being configured to supply hydrogen fuel to a combustor of the gas turbine engine. A priming line is provided, which is configured to provide ullage fluid to the fuel conduit, and a priming valve is configured to selectively control flow through the priming line.

13 Claims, 2 Drawing Sheets

GAS TURBINE ENGINE FUEL SYSTEM

CROSS-REFERENCE TO RELATED APPLICATIONS

This specification is based upon and claims the benefit of priority from United Kingdom Patent Application No. 2312815.0, filed on 22 Aug. 2023, the entire contents of which are incorporated herein by reference.

BACKGROUND

Technical Field

This disclosure relates to a fuel system for a hydrogen fueled aircraft gas turbine engine, and a method of operating such a fuel system.

Description of the Related Art

In order to limit emissions of carbon dioxide, use of hydrogen as an alternative to hydrocarbon fuel in gas turbine engines has historically only been practical in land-based installations. However, more recently there has been interest in aircraft powered by hydrogen stored at cryogenic temperatures, as either a compressed gas, a supercritical fluid, or a liquid.

One challenge of operating such gas turbine engines is engine starting. The engine fuel system must be primed with liquid hydrogen to enable engine starting. However, several problems arise when flowing liquid hydrogen into the fuel system. Firstly, the cold liquid hydrogen will vaporize when it contacts the warm fuel system components, which may cause overpressure. Secondly, any water present in the system will freeze, and gases such as air may liquify and solidify which may cause potential blockages. Thirdly, any oxygen present in the system where hydrogen is present represents a fire risk.

As such, a purging and priming procedure may be necessary prior to flowing liquid hydrogen through the fuel system. Such a procedure may require the use of purging and priming gases, which need to be recharged between each flight, thereby further increasing the complexity of fueling operations between flights. The present disclosure seeks to provide an improved fuel system and method of operation which addresses these problems.

SUMMARY

In a first aspect there is provided a fuel system for a hydrogen fueled gas turbine engine comprising:
- a main hydrogen fuel storage unit configured to store liquid hydrogen, and comprising an ullage space configured to store ullage fluid comprising gaseous or supercritical hydrogen;
- a liquid hydrogen drain line configured to provide liquid hydrogen from the main hydrogen fuel storage unit to a fuel conduit, the fuel conduit being configured to supply hydrogen fuel to a combustor of the gas turbine engine;
- a priming line configured to provide ullage fluid to the fuel conduit; and
- a first priming valve configured to selectively control flow through the priming line.

Advantageously, the hydrogen storage tank can be used to provide priming fluid for the fuel system, thereby obviating the requirement for a separate priming fluid tank.

The fuel system may comprise a drain line valve configured to selectively provide liquid hydrogen from the main hydrogen fuel storage unit to the fuel conduit.

The fuel system may comprise at least a first ullage fluid heater configured to heat ullage fluid. Advantageously, the temperature of the relatively cold ullage fluid can be increased, thereby preventing liquefaction of any gases in the fuel conduit due to excessive cooling by the ullage fluid.

The ullage fluid heater may comprise an electric heater.

The first ullage fluid heater may be provided in heat exchange relationship with ullage fluid upstream in hydrogen fuel flow of the first priming valve. Advantageously, the first ullage heater ensures that ullage fluid is heated prior to entering the fuel conduit, and also enables the ullage valve to be heated prior to operation.

The fuel system may comprise a second ullage fluid heater. The second ullage fluid heater may be provided downstream in hydrogen fuel flow of the first priming valve. Advantageously, the second ullage fluid heater can enable the ullage fluid to be raised to a higher temperature after it enters the fuel conduit. As such, the pressure of the ullage fluid can be raised, thereby providing more effective priming of the system. The second ullage heater may be provided in combination with the first ullage heater, or in place of the first ullage heater.

The fuel system may comprise a second priming valve downstream in purging fluid flow of the first priming valve and the second ullage fluid heater. Advantageously, the volume between the first priming valve and the second priming valve can be heated by the second heater, thereby increasing its pressure prior to release downstream. As such, increased purging gas pressure can be provided, without requiring an increase in main hydrogen storage tank pressure.

The purge line may be configured to communicate with the main fuel conduit upstream of at least a hydrogen fuel pump, and optionally, upstream of a hydrogen fuel preheater. As such, the ullage fluid can be used to prime a plurality of downstream components in the fuel system.

The purge line may be configured to communicate with the main fuel conduit downstream in main hydrogen fuel flow of the fuel system drain line valve. Accordingly, liquid hydrogen is kept separate from the priming fluid.

The pre-heater may comprise an auxiliary combustor configured to combust a portion of hydrogen fuel with air to produce a heated exhaust flow.

Alternatively or additionally, the preheater may comprise a recuperator configured to exchange heat between gas turbine engine exhaust gases and hydrogen fuel.

The hydrogen storage tank may be configured to store hydrogen at an above-ambient pressure, and may be configured to store hydrogen at a pressure between 1 and 20 Bar, and may be configured to store hydrogen at a pressure between 1 and 10 Bar, and may be configured to store hydrogen at a pressure between 1 and 4 Bar.

In a second aspect, there is provided a method of operating a hydrogen fueled gas turbine engine fuel system in accordance with the first aspect comprising, prior to engine start, opening the first priming valve to provide ullage fluid to the main fuel conduit.

The method may comprise heating the ullage fluid prior to its entry to the main fuel conduit.

The method may comprise heating the ullage fluid subsequent to opening the first priming valve.

The method may comprise closing the priming valve subsequent to opening the first priming valve, and subsequently heating the ullage fluid prior to opening a second priming valve to raise its pressure.

In a third aspect there is provided an aircraft comprising a fuel system in accordance with the first aspect.

DESCRIPTION OF THE DRAWINGS

An embodiment will now be described by way of example only with reference to the accompanying drawings, which are purely schematic and not to scale, and in which.

DETAILED DESCRIPTION

Figure 1:
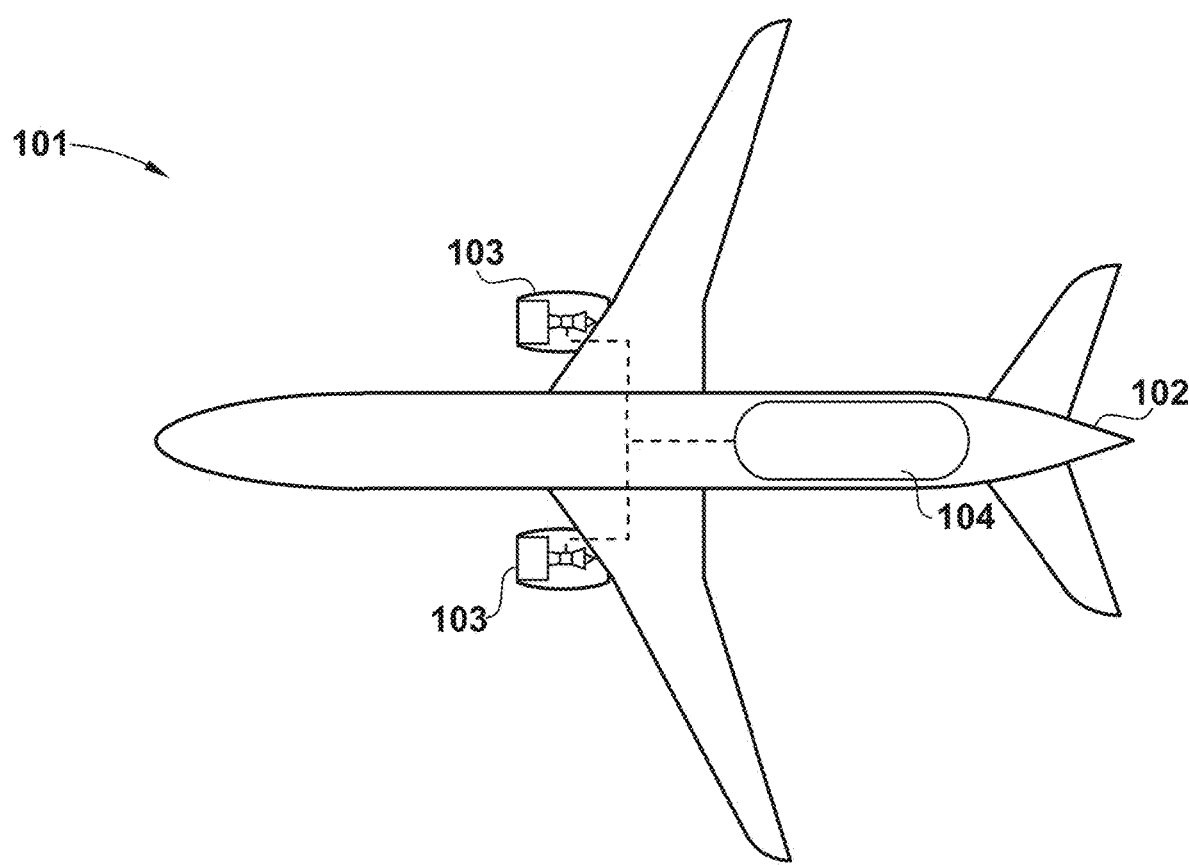
FIG. 1 shows a hydrogen-fueled airliner comprising a propulsion system comprising hydrogen-fueled turbofan engines.

A hydrogen-fueled airliner is illustrated in FIG. 1. In this example, the airliner 101 is of substantially conventional tube-and-wing twinjet configuration with a central fuselage 102 and a propulsion system comprising substantially identical underwing-mounted turbofan engines 103.

A main hydrogen storage tank 104 is located in the fuselage 102. The hydrogen storage tank 104 is a cryogenic hydrogen storage tank and thus stores at least part of the hydrogen fuel in a liquid state, in a specific example at 22 Kelvin. In this example, the hydrogen fuel is pressurised to a pressure from around 1 bar to around 4 bar, in a specific example 4 bar. As will be appreciated, storing the hydrogen fuel at a higher pressure would necessitate heavier tanks to contain the pressure, and increase the risk of leaks. On the other hand, a lower pressure would increase the boiling point of the hydrogen, requiring a lower temperature in the tank, and would risk cavitation in downstream hydrogen plumbing. The main hydrogen storage tank 104 typically comprises insulation to prevent heat from leaking into the tank, which would cause increased pressure in the tank, and may require venting. The relatively large volume and mass of hydrogen stored within the tank also ensures stability.

The hydrogen stored within the tank is multi-phase. Liquid hydrogen 205 resides in the bottom of the tank, and comprises the majority of the mass and volume of the tank. An ullage space 207 is provided above the liquid hydrogen 205, and comprises hydrogen in a second fluid phase. Depending on the temperature and pressure within the tank, this second phase hydrogen may be gaseous or supercritical hydrogen. In either case, the second phase lies above the liquid phase, in view of its lower density. The second phase is typically at a similar temperature to the liquid phase, but may be slightly warmer, due to warmer fluid rising to the top of the tank.

Figure 2:
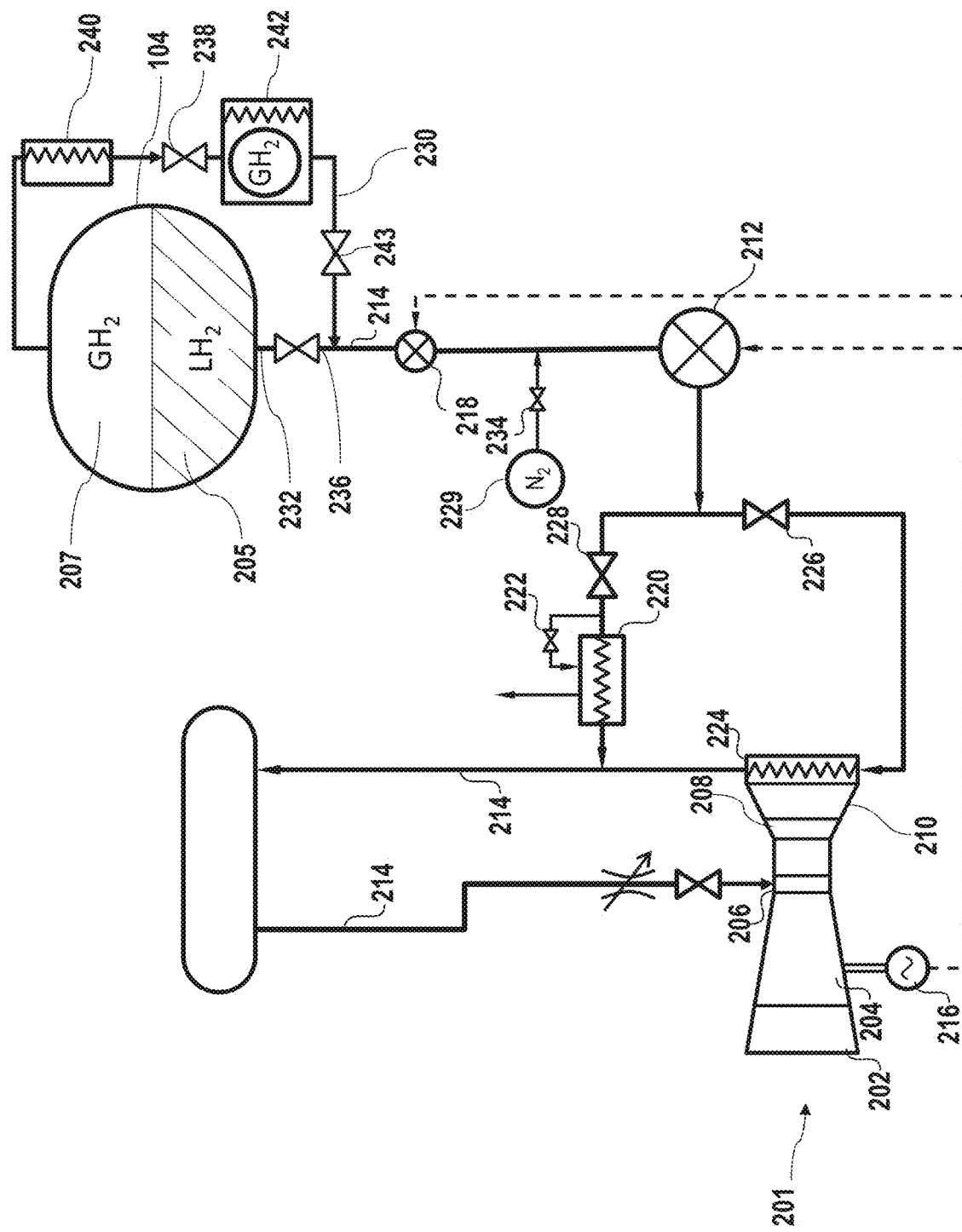
FIG. 2 is a block diagram of a fuel system of the propulsion system of the aircraft of FIG. 1.

A block diagram of one of the propulsion systems comprising one of the engines 103 is shown in FIG. 2.

The turbofan engine 103 comprises a core gas turbine 201.

The core gas turbine 201 comprises, in fluid flow series, separate low and high-pressure compressors 202, 204, a core combustor 206 and a turbine system comprising high and low-pressure turbines 208, 210 The low-pressure compressor 202 is driven by the low-pressure turbine 210 via a low-pressure shaft (not shown) and the high-pressure compressor 204 is driven by the high-pressure turbine 208 via a high-pressure shaft (not shown). A fan (not shown) is typically provided to provide propulsive thrust in addition to that generated by the engine core. It will be appreciated that in alternative embodiments, the core gas turbine could be of three-shaft configuration, and/or could comprise a reduction gearbox between the turbine and fan.

In operation, hydrogen fuel is pumped from the hydrogen storage tank 104 by a main, high-pressure hydrogen fuel pump 212 and into a main fuel conduit 214 which ultimately delivers fuel to the core combustor 203. In the present embodiment, the pump 212 is driven by an electric machine driven by a main engine provided with electrical power from a main engine driven electrical generator 216. In other embodiments, the pump 212 may be driven by one or more of the gas turbine engine core shafts via an auxiliary gearbox (not shown). In some cases, a low-pressure pump 218 may also be provided, upstream of the high-pressure pump 212, and may be provided within the liquid hydrogen tank 104.

The high-pressure hydrogen fuel pump 212 is typically configured to pump liquid hydrogen, rather than primarily to pump gaseous or supercritical hydrogen. As such, the fluid within the pump 212 is substantially incompressible during operation. Suitable pumps include positive displacement pumps (such as piston pumps) or variable displacement pumps such as a centrifugal or axial flow pumps. In the present embodiment, the pump 212 comprises a centrifugal flow pump.

As will be appreciated, it is desirable to increase the temperature of the fuel from the 22 Kelvin cryogenic storage condition to a temperature much closer to the firing temperature of the core gas turbine 201; of course this is subject to the constraint of not exceeding the autoignition temperature of the hydrogen fuel prior to admission into the combustor 206. In an example, the injection temperature is from 250 to 300 kelvin, for example 250 kelvin. In some cases, it may be desirable to increase the fuel temperature to above an icing temperature, such as 273 Kelvin.

In the present embodiment, a pre-heater in the form of an auxiliary combustor 220 is therefore provided for heating of the hydrogen fuel, and possibly to implement a phase change. In the present embodiment, this takes place between the high-pressure fuel pump and the core combustor 206. In an embodiment, the auxiliary combustor 220 is configured to raise the temperature of the hydrogen fuel to the required injection temperature.

The auxiliary combustor comprises an auxiliary combustor fuel offtake 222 configured to divert a portion of the hydrogen fuel from the main fuel conduit 214.

Alternatively, or (as in the current embodiment), additionally, the preheater comprises a recuperator 224. The recuperator 224 comprises a heat exchanger configured to exchange heat between engine exhaust gases downstream in main engine core flow of the turbines 208, 210, with hydrogen in the main fuel conduit 214. As such, the core exhaust gases are cooled, and hydrogen fuel within the conduit 214 is heated. Valves 226, 228 control flow from the pump 212 to each of the auxiliary combustor 220 and recuperator 224 as necessary.

A purging and priming system is also provided, which comprises a supply of one or more purging and priming gases, and one or more valves to control supply of those gases.

In the present embodiment, a purging gas comprising an inert gas such as nitrogen (as in the described embodiment) or helium is provided in a purge tank 229. Flow of purging gas into the main fuel conduit 214 is controlled by operation of a purging valve 234. However, if liquid hydrogen were to be introduced into the relatively warm main fuel conduit immediately after purging, the nitrogen may liquify due to the low temperature of the liquid hydrogen fuel. As such, a priming system is provided.

The priming system comprises a priming line 230. The priming line communicates between the ullage space 207 in the main hydrogen fuel tank 104 and the main hydrogen fuel conduit 214, and is configured to extract gaseous and/or supercritical fluid from the main hydrogen fuel tank. A separate drain line 232 is provided, which communicates between the liquid hydrogen within the tank 104 and the main fluid conduit 214 via a drain valve 236.

A first priming valve 238 is provided in communication with the priming line 230, and is configured to control flow through the priming line 230, to start and stop flow through the line. Typically, when the valve 238 is open, ullage fluid from the ullage space is able to flow through the priming line 230 further downstream in view of the higher pressure within the tank 104 relative to the main fluid conduit 214.

However, in view of the relatively low temperature of the priming/ullage fluid, at least a first heater 240 may be required. The first heater 240 comprises any suitable heater which can raise the temperature of the ullage fluid to a temperature suitable for priming the system, such as an electric heater. Typically, this temperature is above the liquefaction temperature of the purging gas. For example, where the purging gas consists of nitrogen, the first heater 240 is configured to heat the priming fluid to a temperature greater than 80 K. The first heater 240 is provided upstream in hydrogen fuel flow of the valve 238, such that the hydrogen supplied to the valve 238 and any downstream components (which may contain the purging gas in operation) is above the liquefaction temperature.

In some embodiments, a second heater 242 may be provided either in place of, or in addition to the first heater 240. The second heater 242 is similar to the first heater 240, and typically also comprises an electric heater. However, the second heater 242 may comprise a large volume such as a tank to store a volume of gaseous hydrogen in use. The second heater 242 is downstream in priming fluid flow of the first heater 240, and is also downstream of the first priming valve 238. A second priming valve 243 is provided downstream of the first priming valve 238 and second heater 242 in the priming line 230. Operation of the first and second heaters 240, 242 and priming valves 238, 243 is described in further detail below.

The system can be operated in accordance with purging, priming and operating modes.

Purging is necessary to remove any air from the system, which would comprise oxygen and present a fire hazard if mixed with hydrogen. Additionally, any liquid water would freeze at the temperatures present in the fuel system during operation.

During the purging step, valve 234 is opened to allow nitrogen to flow from the purging tank 229 into the fuel conduit 214 and through the pump 212, preheaters 224, 220 and various downstream components.

Once the system is purged, all valves are closed again to seal the system from ingress with air.

In a priming step, the system is then primed with relatively warm gaseous/supercritical hydrogen from the priming line 230 into the fuel conduit 214. Valve 238 is opened, and the first heater 240 is typically operated to permit the heated gaseous/supercritical hydrogen to flow through each of the pump 212, preheaters 224, 220 and various downstream components, to remove the nitrogen purge gas from each of these systems, which would otherwise freeze on introduction of liquid hydrogen to the system.

In such a system, it may be necessary for the main hydrogen tank 104 to be pressurised to a higher pressure than that used in normal operation. For example, the hydrogen tank 104 may be fueled to a pressure of around 10 Bar for priming. Once the priming step is completed, the normal operating pressure of the tank may be reduced to between 1 and 4 Bar.

In one embodiment, a further operation can take place to increase the pressure within the fuel conduit 214. It has been found by the inventors that the internal tank pressure within the main fuel tank 104 may be insufficient to fully drive the nitrogen from the fuel system prior to engine starting. On the other hand, pumping the gaseous hydrogen at the necessary pressure may be difficult, in view of the physical properties of gaseous hydrogen, and the unsuitability of the liquid hydrogen pump 212 for pumping gaseous or supercritical hydrogen.

As such, following heating of the hydrogen by the first heater 240, and flow of hydrogen downstream in the priming line 230 via the valve 238, the valve 238 is then shut once the priming line 230 and second heater 242 volume is full of gaseous hydrogen, at a pressure at or close to the hydrogen tank storage pressure (4 Bar in this example). The second heater 242 is then operated to raise the temperature in the volume between the first and second priming valves 238, 243 and second heater 242, therefore raising the pressure of the hydrogen within the line 230. Once the pressure is sufficiently raised, the second priming valve 243 is opened to release the higher pressure, higher temperature gaseous hydrogen into the main fuel conduit 214 and downstream components. In such a case, the first heater 240 may be omitted.

Once the system is fully primed with gaseous hydrogen, the starting process can continue. The engine compressor 202 or 204 is cranked, or continues to be cranked, to generate sufficient compressed airflow and pressure for delivery of a required inlet pressure at the pre-heater 208 to support combustion. The drain valve 236 is then opened, and liquid fuel is provided from the tank 104, pumped by the pump 212, heated by the preheater 220, 224 and delivered to the combustor 206 where it is combusted. The engine is now started.

As such, a fuel system and operating method are described, in which a gas turbine engine fueled by liquid hydrogen can be purged and primed, without requiring external equipment for refilling a priming tank after each flight.

Additional advantages include potential weight savings of removing the hydrogen priming tank. Turnaround times may also be improved.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

Changes may be made to the disclosed embodiment without departing from the invention as defined by the claims. For example, either pre-heater may be eliminated, or replaced with a different type of preheater, such as an electrically powered resistance heater. Similarly, the gas turbine engine could be of a different form, and could comprise two or even three shafts, with associated compressors and turbines.

The invention claimed is:

1. A fuel system for a hydrogen fueled gas turbine engine comprising:

a main hydrogen fuel storage unit configured to store liquid hydrogen, and comprising an ullage space configured to store an ullage fluid comprising gaseous or supercritical hydrogen;

a liquid hydrogen drain line configured to provide liquid hydrogen from the main hydrogen fuel storage unit to a fuel conduit, the fuel conduit being configured to supply hydrogen fuel to a combustor of the gas turbine engine;

a priming line configured to provide the ullage fluid to the fuel conduit; and a first priming valve configured to selectively control ullage fluid flow through the priming line; and wherein the priming line is configured to communicate with the fuel conduit upstream of at least a hydrogen fuel pump with respect to the hydrogen fuel flow.

2. The fuel system according to claim 1, wherein the fuel system comprises a drain line valve configured to selectively provide liquid hydrogen from the main hydrogen fuel storage unit to the fuel conduit.

3. The fuel system according to claim 2, wherein the priming line is configured to communicate with the fuel conduit downstream of the drain line valve with respect to hydrogen fuel flow.

4. The fuel system according to claim 1, wherein the fuel system comprises at least a first ullage fluid heater configured to heat the ullage fluid.

5. The fuel system according to claim 4, wherein the first ullage fluid heater is provided of the first priming valve with respect to ullage fluid flow.

6. The fuel system according to claim 4, wherein the fuel system comprises a second ullage fluid heater downstream in hydrogen fuel flow of the first priming valve with respect to ullage fluid flow.

7. The fuel system according to claim 6, wherein the fuel system comprises a second priming valve downstream of the first priming valve and the second ullage fluid heater with respect to ullage fluid flow.

8. The fuel system according to claim 1, wherein the main hydrogen fuel storage unit is configured to store the hydrogen fuel between 1 Bar and 20 Bar.

9. The fuel system according to claim 8, wherein the main hydrogen fuel storage unit is configured to store the hydrogen fuel between 1 Bar and 10 Bar.

10. The fuel system according to claim 9, wherein the main hydrogen fuel storage unit is configured to store the hydrogen fuel between 1 Bar and 4 Bar.

11. A method of operating the hydrogen fueled gas turbine engine fuel system in accordance with claim 1, the method comprising, prior to engine start, opening the priming valve to provide the ullage fluid to the fuel conduit; heating the ullage fluid subsequent to opening the first priming valve; closing the first priming valve subsequent to opening the first priming valve, and subsequently heating the ullage fluid prior to opening a second priming valve to raise the pressure of the ullage fluid.

12. The method according to claim 11, comprising heating the ullage fluid prior to its entry to the main fuel conduit.

13. An aircraft comprising the fuel system for a hydrogen fueled gas turbine engine of claim 1.

* * * * *